United States Patent [19]

Davidson et al.

[11] Patent Number: 5,727,119
[45] Date of Patent: Mar. 10, 1998

[54] METHOD AND APPARATUS FOR EFFICIENT IMPLEMENTATION OF SINGLE-SIDEBAND FILTER BANKS PROVIDING ACCURATE MEASURES OF SPECTRAL MAGNITUDE AND PHASE

[75] Inventors: Grant Allen Davidson, Oakland; Stephen Decker Vernon, San Francisco, both of Calif.

[73] Assignee: Dolby Laboratories Licensing Corporation, San Francisco, Calif.

[21] Appl. No.: 412,377

[22] Filed: Mar. 27, 1995

[51] Int. Cl.$^6$ .................................................. G10L 3/02
[52] U.S. Cl. .................. 395/2.12; 395/2.1; 395/2.67; 395/2.2; 395/2.15; 395/2.92; 375/240
[58] Field of Search .................... 381/29, 30, 33, 381/2, 92, 103, 34–37; 395/2.1, 2.12, 2.14, 2.38, 2.39, 2.36

[56] References Cited

U.S. PATENT DOCUMENTS

| | | | |
|---|---|---|---|
| 4,567,607 | 1/1986 | Bruney | 381/97 |
| 4,790,016 | 12/1988 | Mazor et al. | 381/36 |
| 4,896,362 | 1/1990 | Veldhuis | 381/30 |
| 5,042,069 | 8/1991 | Chhatwal et al. | 381/31 |
| 5,109,417 | 4/1992 | Fielder et al. | 381/36 |
| 5,142,656 | 8/1992 | Fielder et al. | 381/37 |
| 5,157,760 | 10/1992 | Akagiri | 395/2 |
| 5,185,800 | 2/1993 | Mahieux . | |
| 5,285,498 | 2/1994 | Johnston | 381/2 |
| 5,294,925 | 3/1994 | Akigiri | 381/37 |
| 5,297,236 | 3/1994 | Antill et al. . | |
| 5,311,561 | 5/1994 | Akagiri | 395/2.13 |
| 5,357,594 | 10/1994 | Fielder et al. | 395/2.2 |
| 5,394,473 | 2/1995 | Davidson | 381/36 |
| 5,400,409 | 3/1995 | Linhard et al. | 381/92 |
| 5,451,954 | 9/1995 | Davis et al. | 341/200 |
| 5,479,562 | 12/1995 | Fielder et al. | 395/2.38 |
| 5,559,834 | 9/1996 | Edler | 375/260 |
| 5,583,962 | 12/1996 | Davis et al. . | |

OTHER PUBLICATIONS

J. Princen and A. Bradley, "Analysis/Synthesis Filter Bank Design Based on Time Domain Aliasing Cancellation," *IEEE Trans. on Acoust., Speech, Signal Proc.*, ASSP–34, 1986, pp. 1153–1161.

J. Princen, A. Johnson, and A. Bradley, "Subband/Transform Coding Using Filter Bank Designs Based on Time Domain Aliasing Cancellation," *ICASSP 1987 Conf. Proc.*, May 1987, pp. 2161–2164.

Schroeder et al, "Optimizing Digital Speech Coders by Exploiting Masking Properties of the Human Ear", JASA, Dec. 1979, p. 1647–1652.

Crochiere et al, "Multirate Digital Signal Processing", Prentice Hall, pp. 366–376, 1983.

Cramer et al, "Computationally Efficient Real Valued Filter Banks Based on a Modified OODFT" Signal Processing V: Theories and Applications, Elsevier Science Publishers B.V., 1990, pp. 585–588.

(List continued on next page.)

*Primary Examiner*—Allen R. MacDonald
*Assistant Examiner*—Michael N. Opsasnick
*Attorney, Agent, or Firm*—Thomas A. Gallagher; David N. Lathrop

[57] ABSTRACT

Accurate measures of estimated spectral power and phase are derived from two spectral representations of each of one or more input signals generated by single-sideband filter banks including critically-sampled perfect-reconstruction filter banks implemented by generalized forms of Time Domain Aliasing Cancellation transforms. The derived measures of spectral magnitude and phase may be used in various applications including adaptive bit allocation in perceptual coding systems. An efficient implementation of one particular single-sideband critically-sampled filter bank comprises folding and shuffling blocks of real-valued input signal samples into blocks of complex-valued samples, rotating the complex-valued samples in the complex plane, transforming the rotated samples into transform coefficients, and rotating and shuffling the transform coefficients to form the spectral representation.

20 Claims, 4 Drawing Sheets

OTHER PUBLICATIONS

Malvar, "Lapped Transforms for Efficient Transform/Subband Coding", IEEE Trans. Acoust., Speech, and Signal Proc., ASSP-38, Jun. 90, pp. 969-978.

Gluth, "regular FFT-Related Transform Kernels for DCT/DST—Base Polyphase Filter Banks", ICASSP 1991 Conf. Proc., vol. 3, May 1991, pp. 2205-2208.

Duhamel et al, "A Fast Algorithm for the Implemntation of Filter Bansk Based on Time Domain Aliasing Cancellation," ICASSP 1991 Conf. Proc., vol. 3, pp. 22092212, May 1991.

Ramsted et al, "Cosine Modulated Analysis Synthesis Filterbank with Critical Sampling and Perfect Reconstruction", 1991 IEEE, Doc. # CH2977-7/91/0000-1789, Jul. 1991.

"ISO 11172-3 Coding of Moving Pictures and Associated Audio for Digital Storage Media at up to About 1.5Mbits/s," Part 3, Jun. 2, 1994, pp. 1-48; Annex C pp. 1-4, 10-16, 20-23, 36-43; Annex D pp. 1-12, 37-42, Jun. 1992.

METHOD AND APPARATUS FOR EFFICIENT IMPLEMENTATION OF SINGLE-SIDEBAND FILTER BANKS PROVIDING ACCURATE MEASURES OF SPECTRAL MAGNITUDE AND PHASE

TECHNICAL FIELD

The invention relates in general to signal processing and more particularly to efficient implementation of single-sideband signal analysis filter banks which may be used in various signal processing applications.

Throughout the following discussion and especially in the background art discussion, more particular mention is made of audio coding applications; however, it should be understood that the present invention is also applicable to other applications.

BACKGROUND ART

Many digital signal processing (DSP) applications attempt to reduce the amount of information required to adequately represent an input signal. By reducing information capacity requirements, a signal representation can be transmitted over channels having lower bandwidth or stored on media using less space.

Coding can reduce the information capacity requirements of an input signal by eliminating either redundant components or irrelevant components in the signal. So called perceptual coding methods and systems often use filter banks to reduce redundancy by decorrelating an input signal into a basis set of spectral components, and reduce irrelevancy by adaptive bit allocation according to psycho-perceptual criteria based on estimates of spectral power or magnitude. In audio coding, for example, coding systems often employ psycho-acoustic models based on the work of E. Zwicker, *Psychoacoustics*, 1981, which relates spectral masking to spectral power. An example of a perceptual model based on spectral magnitude is discussed in M. Schroeder, et al.; "Optimizing Digital Speech Coders by Exploiting Masking Properties of the Human Ear," *J. Acoust. Soc. Am.*, December 1979, pp. 1647–1652.

Many digital perceptual coding systems employ perceptual models such as that discussed in Schroeder, et al., cited above. These models attempt to predict the audibility of each spectral component in a signal from the frequency and magnitude of all spectral components in the signal. Spectral components, deemed to be irrelevant because they are not expected to be audible, need not be included in the encoded signal. Other spectral components can be quantized using just enough bits to ensure that the quantizing error or "quantizing noise" is rendered inaudible by other spectral components. Accurate predictions by a perceptual model allows a perceptual coder to allocate an optimum number of bits to each spectral component. A coder using models known to provide inaccurate predictions must generally allocate additional bits to prevent audible degradation of the encoded signal. Perceptual models based on Zwicker's work such as that discussed by Schroeder, et al. are based on spectral magnitude; therefore, the accurate model prediction requires accurate measures of spectral magnitude.

Two common perceptual coding techniques are subband coding and transform coding. Filter banks in both subband and transform coders may be implemented by any of several time-domain to frequency-domain transforms. See J. Tribolet and R. Crochiere, "Frequency Domain Coding of Speech," *IEEE Trans. Acoust., Speech, and Signal Proc.*, ASSP-27, October, 1979, pp. 512–30. One or more adjacent transform coefficients may be grouped together to define "subbands" having effective bandwidths which are sums of individual transform coefficient bandwidths.

Many coding systems use single-sideband (SSB) filter banks. A "single-sideband" filter bank, as discussed in R. Crochiere and L. Rabiner, "Multirate Digital Signal Processing," Prentice-Hall, 1983, pp. 366–376, generates a spectral representation having component values which are either purely real or purely imaginary in response to real-valued input signal samples. The use of certain SSB filter banks in coding applications is often very attractive because they permit implementation of perfect-reconstruction critically-sampled filter banks. Perfect reconstruction refers to the property of an analysis/synthesis filter bank pair to reconstruct perfectly an input signal in the absence of errors caused by finite precision. Critical sampling refers to the property of an analysis filter bank to generate a number of spectral components which is no greater than the number of samples used to convey the input signal.

The concept of critical sampling deserves some comment. Although the DFT, for example, generates one spectral component for each sample in a signal sample block, in many coding applications, DFT-based analysis and synthesis filter banks do not allow perfect reconstruction of the input signal with critically sampling because the transform is applied to a sequence of overlapping signal sample blocks. The overlap allows use of non-rectangular shaped window functions which improves analysis filter bank frequency response characteristics and which eliminates blocking artifacts; however, the overlap also prevents perfect reconstruction with critical sampling because the analysis filter bank must generate more coefficient values than the number of input signal samples. This loss of critical sampling increases the information capacity requirements of the encoded signal.

Two well known SSB analysis filter banks implemented by overlapping-block transforms permit perfect reconstruction with critical sampling using time-domain aliasing cancellation (TDAC). One filter bank, described in J. Princen and A. Bradley, "Analysis/Synthesis Filter Bank Design Based on Time Domain Aliasing Cancellation," *IEEE Trans. on Acoust., Speech, Signal Proc.*, ASSP-34, 1986, pp. 1153–1161, comprises the alternate application of a modified Discrete Cosine Transform (DCT) with a modified Discrete Sine Transform (DST) and is described as the time-domain equivalent of an evenly-stacked critically-sampled single-sideband analysis-synthesis system. The modified DCT and modified DST are referred to collectively herein as the Evenly-stacked Time-Domain Aliasing Cancellation (E-TDAC) transform. The second filter bank, described in J. Princen, A. Johnson, and A. Bradley, "Subband/Transform Coding Using Filter Bank Designs Based on Time Domain Aliasing Cancellation," *ICASSP 1987 Conf. Proc.*, May 1987, pp. 2161–64, is implemented by a single modified DCT and is described as the time-domain equivalent of an oddly-stacked critically sampled single-sideband analysis-synthesis system. It is referred to herein as the Oddly-stacked Time-Domain Aliasing Cancellation (O-TDAC) transform. Each of the TDAC analysis filter banks are applied to signal sample blocks which overlap by one-half the block length but they achieve perfect reconstruction with critically sampling by effectively discarding one-half of the transform coefficients. The missing coefficients cause time-domain aliasing in a companion synthesis filter bank but the aliasing is cancelled by overlapping and adding the blocks generated by the synthesis filter bank.

SSB filter banks such as the TDAC filter banks are very attractive in many coding application because they permit perfect reconstruction using overlapping-block transforms, are critically sampled, and can be implemented using reasonably efficient methods. For example, some efficient implementations are disclosed in S. Cramer and R. Gluth, "Computationally Efficient Real-Valued Filter Banks Based on a Modified $O^2$DFT," *Signal Processing V: Theories and Applications*, Elsevier Science Publishers B.V., 1990, pp. 585–588. H. Malvar, "Lapped Transforms for Efficient Transform/Subband Coding," *IEEE Trans. Acoust., Speech, and Signal Proc.*, ASSP-38, June 1990, pp. 969–78. R. Gluth, "Regular FFT-Related Transform Kernels for DCT/DST-Based Polyphase Filter Banks," *ICASSP* 1991 *Conf. Proc.*, vol. 3, May 1991, pp. 2205–2208. P. Duhamel. Y. Mahieux, and J. Petit, "A Fast Algorithm for the Implementation of Filter Banks Based on Time Domain Aliasing Cancellation," *ICASSP* 1991 *Conf. Proc.*, vol. 3, May 1991, pp. 2209–2212, and M. Antill and G. Davidson, U.S. Pat. No. 5,297,236 issued Mar. 22, 1994, all of which are incorporated by reference in their entirety.

An example of a digital audio coding system using a SSB TDAC filter bank which adaptively allocates bits according to a model based on Zwicker's work to quantize spectral components is disclosed in Y. Mahieux, U.S. Pat. No. 5,185,800 issued Feb. 9, 1993, which is incorporated by reference in its entirety. Unfortunately, the accuracy of perceptual models in coding systems which use the TDAC filter banks is generally not optimum because the transforms used to implement SSB filter banks do not generate information sufficient to derive accurate estimates of spectral magnitude. Because accurate measures of magnitude cannot be derived from the spectral representations generated by TDAC filter banks, the magnitude-based perceptual models employed by coding systems using the TDAC filter banks cannot provide predictions as accurate as would be possible if better estimates of magnitude were available.

One technique for obtaining accurate measures is disclosed in "ISO 11172-3 Coding of Moving Pictures and Associated Audio for Digital Storage Media at Up to About 1.5 Mbit/s," ISO/IEC JTC1/SC29/WG11, Part III Audio, draft dated Jun. 2, 1994. According to this technique, a SSB filter bank is used to generate a spectral representation for encoding and an additional FFT-based filter bank is used to derive accurate measures of spectral magnitude for bit allocations. This technique is not attractive because considerable resources are required to implement the additional filter bank needed to derive these measures.

What is needed is an efficient technique which implements a critically-sampled filter bank permitting perfect reconstruction and which also provides sufficient information for deriving accurate measures of spectral magnitude and phase.

DISCLOSURE OF INVENTION

It is an object of the present invention to provide for an efficient critically-sampled filter bank permitting perfect reconstruction and which also provides accurate measures of spectral magnitude and phase.

In accordance with the teachings of the present invention, a single-channel processing method includes the steps of receiving input signal samples and forming a sequence of signal sample blocks, generating a first spectral representation of the sequence of signal sample blocks, generating a second spectral representation of the sequence of signal sample blocks, deriving measures of spectral magnitude and phase from the first and second spectral representations, generating an output signal by processing the first spectral representation using a process adapted in response to the derived measures of magnitude and/or phase.

In one embodiment, the first spectral representation is generated by folding or combining N input signal samples into a set of ½N combined samples, shuffling or rearranging the order of the combined samples into a set of ¼N complex-valued samples, applying a complex rotational function to the complex-valued samples, generating ¼N interim transform coefficients by applying a block-transform function to the rotated complex-valued samples, applying a complex rotation function to the interim transform coefficients, and generating the first spectral representation by shuffling the rotated coefficients into a set of ½N real spectral values. The second spectral representation is generated by substantially the same process except that the first step of folding is performed on a time-reversed set of input signal samples and the last step of shuffling optionally inverts the sign of half the values in the spectral representation. Variations are possible and described below.

Aspects of the present invention may be applied to process multiple input signals and may be embodied in devices implemented by various technologies including linear circuits and microprocessor-controlled DSP devices. Various features and alternatives are described in the following discussion and illustrated in the accompanying drawings in which like reference numerals refer to like elements in the several figures. The contents of the following discussion and the drawings are set forth as examples only and should not be understood to represent limitations upon the scope of the present invention. Although the present invention is more particularly described for audio encoding applications, it should be appreciated that the invention is much broader and may be applied to other applications.

MODES FOR CARRYING OUT THE INVENTION

I. Basic Embodiments

Figure 1:
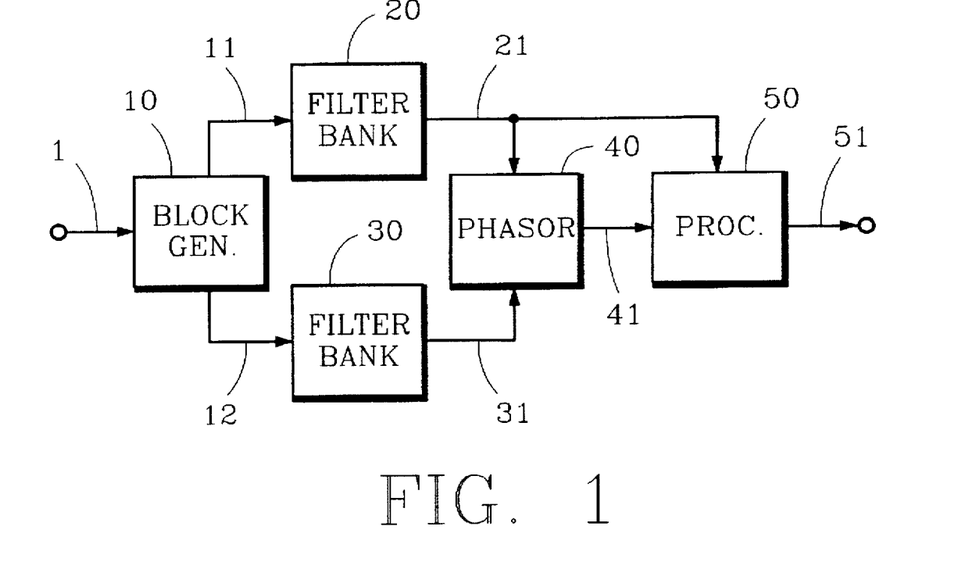
FIG. 1 is a functional block diagram of a single-channel device with two filter banks generating two spectral representations from which accurate measures of spectral magnitude and/or phase are derived, and a processor generating an output signal by processing one of the spectral representations using a process adapted in response to the derived measures of spectral magnitude and/or phase.

FIG. 1 illustrates the basic functions incorporated into a single-channel device according to one aspect of the present invention. Block generator 10 buffers input samples received from input signal path 1 into a sequence of signal sample blocks, filter bank 20 generates along path 21 a first spectral representation of the sequence of signal sample blocks received from path 11, filter bank 30 generates along path 31 a second spectral representation of the sequence of signal sample blocks received from path 12, phasor 40 derives measures of magnitudes of spectral components in the input signal from the first and second spectral representations received from paths 21 and 31, respectively, and processor 50 generates an output signal along path 51 in response to the first spectral representation received from path 21 using a process adapted in response to the derived measures of spectral magnitude received from path 41.

In a digital signal coding application, for example, processor 50 is an encoder which generates an encoded signal by quantizing the first spectral representation using a number of bits adaptively allocated in response to the derived measures of spectral magnitude, and assembles the encoded information into an output signal suitable for transmission or storage. In another application, processor 50 is an adaptive graphic equalizer which applies variable gains to components of the first spectral representation according to the derived measures of spectral magnitude to achieve an output audio signal with desired magnitude levels across the bandwidth. These two examples show that the present invention may be applied in a wide variety of applications.

Alternatives in implementation are possible. For example, in one alternative, filter bank 20 and filter bank 30 are both implemented by a single complex transform from which the real output provides one spectral representation and the imaginary output provides the other spectral representation. In another alternative, each filter bank is implemented by separate transforms. Phasor 40 may derive measures for both spectral magnitude and phase as described below. In coding applications, processor 50 may encode the derived measures of magnitude and/or phase received from path 41 and assemble the encoded measures into the output signal.

A basic embodiment of the present invention is introduced in some detail before alternative embodiments are discussed. An input signal comprises signal samples which represent an audio signal. In a digital implementation of the basic embodiment, the input signal comprises discrete-valued samples. In an analog implementation, the input signal comprises analog signals with amplitudes which may vary continuously over a given range. The signal samples are formed into a sequence of blocks each of N samples. Filter banks are implemented by one or more N-point transforms.

A. Block Generator

Block generator 10 receives input signal samples and groups them into a sequence of signal sample blocks. The signal samples may be received from the sampling of an analog signal, from the generation of samples representing or simulating an analog signal, or from any other source of samples which correspond to a time-domain signal. The signal sample blocks may overlap, if desired, by any appropriate amount.

Many practical systems incorporating filter banks implemented by transforms seek to improve filter bank performance by weighting samples in each input signal sample block using a carefully designed analysis-window function and by applying the filter bank transform to overlapping signal sample blocks. The length of the block overlap is chosen so that the temporal modulation caused by application of the analysis-window function can be compensated.

Some transforms do not require the use of analysis-window functions; however, the O-TDAC and E-TDAC transforms mentioned above and described below require the use of a pair of analysis- and synthesis-window functions. The analysis-window function is applied prior to application of an analysis filter bank, and the synthesis-window function is applied following application of a synthesis filter bank. It is assumed herein that the buffered signal samples are weighted by an analysis-window function as may be required or desired. Input signal samples may be weighted by an analysis-window function prior to or subsequent to receipt by block generator 10 without departing from the scope of the present invention. The weighting may be performed by digital multiplication circuits or microprocessors in digital implementations, or by amplifiers in analog implementations.

Figure 2A:
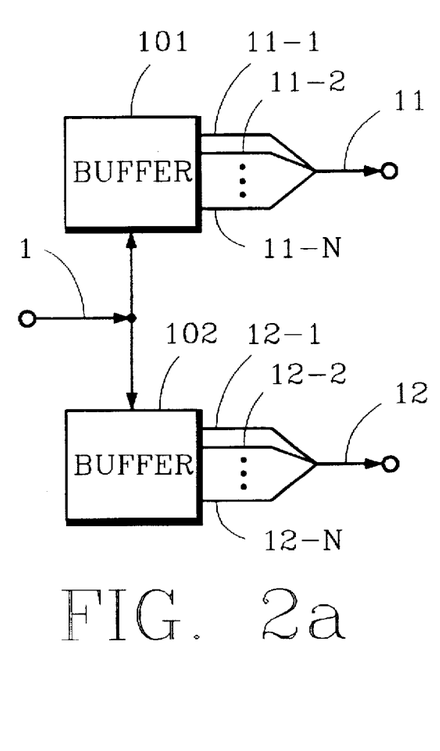
FIGS. 2a–2b are schematic representations of two embodiments of a block generator which forms blocks of signal samples.

The way in which block generator 10 is implemented is not critical to the practice of the present invention. FIG. 2a illustrates in functional form a circuit which may be used to implement block generator 10. Signal samples received from path 1 are stored in buffer 101 and the value of each sample in a block is obtained along a respective one of paths 11-1 to 11-N, collectively referred to as path 11. The value obtained from path 11-1 represents the oldest sample in a block and the value obtained from path 11-N represents the most recent sample in the block. Signal samples received from path 1 are also stored in buffer 102 and the value of each sample in a block is obtained along a respective one of paths 12-1 to 12-N, collectively referred to as path 12. The value obtained from path 12-1 represents the most recent sample in the block and the value obtained from path 12-N represents the oldest sample in the block. In this particular embodiment, block generator 10 passes along path 11 the samples in normal time order and passes along path 12 the samples in time-reversed order. As explained below, having samples in time-reversed order allows for certain efficiencies in filter bank implementation.

Figure 2B:
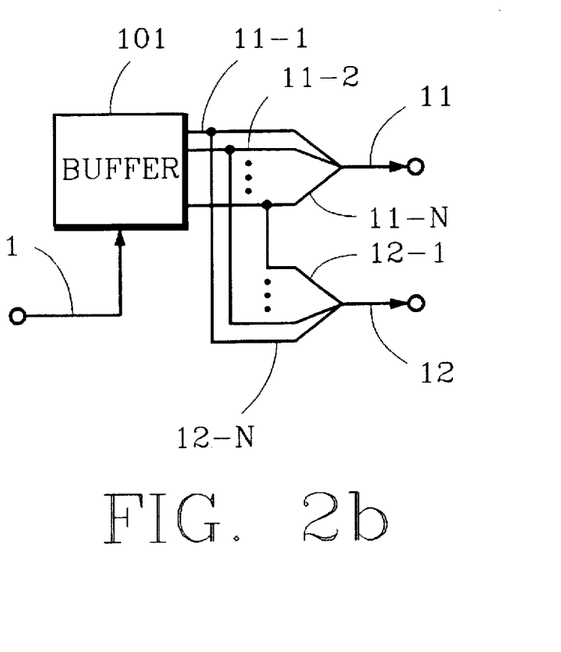

FIG. 2b illustrates in functional form another circuit which may be used to implement block generator 10. Signal samples received from path 1 are stored in buffer 101 and the value of each sample in a block may be obtained along either of two paths. Values obtained from paths 11-1 to 11-N, collectively referred to as path 11, are in normal time order. Values obtained from paths 12-1 to 12-N, collectively referred to as path 12, are in time-reversed order.

In another embodiment not shown in any figure, block generator 10 comprises one buffer and paths 11 and 12 are identical. Neither path provides time-reversal. This embodiment is preferred when time-reversed samples provide no advantage in filter bank implementation.

In preferred embodiments, block generator 10 is implemented in conventional fashion by random access memory (RAM). Values are stored to and fetched from locations in RAM specified by addresses under micro-processor or digital signal processor (DSP) control.

B. Filter Banks

Filter bank 20 is a SSB filter bank which may be implemented by various techniques. One suitable choice is the O-TDAC filter bank implemented by a modified DCT applied to a sequence of signal sample blocks $$C_O(m,k) = \frac{\cos(\pi mk)}{N} \sum_{n=0}^{N-1} x(n) \cdot \cos\left[ 2\pi \left( k + \frac{1}{2} \right) \frac{(n+n_0)}{N} \right] \quad (1)$$

for $0 \leq k < \frac{N}{2}$ where $C_o(m,k)$=spectral component k in signal sample block m, x(n)=windowed, real-valued signal sample n, and $n_0=\frac{1}{2}N+\frac{1}{2}$.

Filter bank 20 may also be an E-TDAC filter bank which may be implemented by the alternate application of the modified DCT (MDCT) and the modified DST (MDST) to a sequence of signal sample blocks $$C_E(m,k) = (-1)^{mk} \cdot \cos\left(\frac{m\pi}{2}\right) \cdot \frac{1}{N} \sum_{n=0}^{N-1} x(n) \cdot \cos\left[2\pi k \frac{(n+n_0)}{N}\right] \text{ for } 0 \leq k < \frac{N}{2} \quad (2)$$

$$S_E(m,k) = (-1)^{mk} \cdot \sin\left(\frac{m\pi}{2}\right) \cdot \frac{1}{N} \sum_{n=0}^{N-1} x(n) \cdot \sin\left[2\pi k \frac{(n+n_0)}{N}\right] \text{ for } 0 < k \leq \frac{N}{2} \quad (3)$$

where $C_E(m,k)$=MDCT spectral component k in signal sample block m, $S_E(m,k)$=MDST spectral component k in signal sample block m, and $n_0=\frac{1}{2}N+\frac{1}{2}$.

The E-TDAC filter bank generates alternating sets of spectral components $\{C_E(m,k)\}$ and $\{S_E(m,k)\}$ in response to a sequence of signal sample blocks.

The O-TDAC and E-TDAC filter banks achieve critical sampling by discarding half of the spectral components. The loss of these components generates time-domain aliasing in the synthesis filter bank, however, this aliasing is cancelled by overlapping and adding the blocks recovered by the synthesis filter bank.

Because the TDAC filter banks are critically sampled, they are used in many coding applications such as perceptual coding systems. Digital perceptual coders adaptively allocate bits to quantize spectral components according to psycho-perceptual models. These models are often derived from empirical data expressed as a function of spectral magnitude and sometimes phase. Unfortunately, neither TDAC filter bank generates a set of spectral components from which accurate measures of spectral magnitude and/or phase may be derived. Perceptual coding systems using either TDAC filter bank must base bit allocations on the values of the spectral components themselves, however, the inventors have determined that the TDAC spectral component values provide poor measures of spectral magnitude and provide no measure of spectral phase.

Filter bank 30 is a SSB filter bank which generates a set of spectral components that, taken together with the spectral components generated by filter bank 20, permits accurate measures of spectral magnitude and/or phase to be derived. The implementation of filter bank 30 is discussed below.

C. Phasor

A technique for deriving accurate estimates of spectral magnitude and phase from spectral components generated by a SSB filter bank can be developed by first recognizing that SSB filter banks like the TDAC filter banks mentioned above can be expressed more generally as "generalized" filter banks. The generalized TDAC filter banks are equivalent to the conventional TDAC filter banks because they generate spectral representations having components with absolute values equal to those generated by corresponding TDAC filter banks but the signs of some of the spectral components are inverted. The inversion of signs is of little practical significance because a complementary synthesis-filter bank can correctly reconstruct the signal. The generalized expression of the filter bank does not vary from block to block; therefore, the block number m notation is omitted in the following discussion. For ease of discussion, generalized forms of the O-TDAC and E-TDAC filter banks are referred to as GO-TDAC and GE-TDAC filter banks, respectively, and both generalized TDAC filter banks are referred to collectively as G-TDAC filter banks. The transforms implementing the G-TDAC filter banks may be expressed as $$X(k) = \frac{1}{N} \sum_{n=0}^{N-1} x(n) \cdot e^{-j\frac{2\pi}{N}(k+k_0)(n+n_0)} \quad (4)$$

and the spectral components obtained from the G-TDAC filter banks may be expressed as $C_{GO}(k)=Re\{X(k)\}$, $k_0=\frac{1}{2}$ and $n_0=\frac{1}{4}N+\frac{1}{2}$, for $0 \leq k < \frac{1}{2}N$, (5a)

$C_{GE}(k)=Re\{X(k)\}$, $k_0=0$ and $n_0=\frac{1}{4}N+\frac{1}{2}$, and (5b)

$S_{GE}(k)=Im\{X(k)\}$, $k_0=0$ and $n_0=\frac{1}{4}N+\frac{1}{2}$, for $0 \leq k < \frac{1}{2}N$, (5c)

where $C_{GO}(k)$=MDCT spectral component k for the GO-TDAC filter bank, $C_{GE}(k)$=MDCT spectral component k for the GE-TDAC filter bank, $S_{GE}(k)$=MDST spectral component k for the GE-TDAC filter bank, $Re\{X(k)\}$=real part of the complex function X(k), and $Im\{X(k)\}$=imaginary part of the complex function X(k).

It can be shown that $$\sum_{k=0}^{N-1} X_R^2(k) + X_I^2(k) = \sum_{k=0}^{N-1} X(k) \cdot X^*(k) = \frac{1}{N} \sum_{n=0}^{N-1} x^2(n) \quad (6)$$

where $X_R(k)=Re\{X(k)\}$ and $X_I(k)=Im\{X(k)\}$. This expression indicates that the Parseval identity holds with no restriction on the value of $k_0$ or $n_0$. It can also be shown that $X(N-k-2k_0)$ can be derived from a complex rotation of X(k) for $2k_0=i$, where i is an integer, or $$X(N-k-2k_0) = X^*(k) \cdot e^{-j2\pi n_0} \quad (7)$$

thereby allowing the sequence $\{X(\frac{1}{2}N), \ldots X(N-1)\}$ to be derived from $\{X(0), \ldots X(\frac{1}{2}N-1)\}$ for $k_0=0$ or $k_0=\frac{1}{2}$. Further, it can be shown that the Parseval identity holds true for the GO-TDAC filter bank, which can be expressed as $$\sum_{k=0}^{\frac{N}{2}-1} X(k) \cdot X^*(k) = \frac{1}{2N} \sum_{n=0}^{N-1} x^2(n) \quad (8a)$$

where $k_0=\frac{1}{2}$, and that the Parseval identity holds true for the GE-TDAC filter bank, which can be expressed as $$\frac{X(0) \cdot X^*(0)}{2} + \sum_{k=1}^{\frac{N}{2}-1} X(k) \cdot X^*(k) + \tag{8b}$$

$$\frac{X\left(\frac{N}{2}\right) \cdot X^*\left(\frac{N}{2}\right)}{2} = \frac{1}{2N} \sum_{n=0}^{N-1} x^2(n)$$

where $k_0 = 0$.

As a result of these relationships, it follows that $$P(k) = X(k) \cdot X^*(k) \tag{9a}$$

$$\Phi(k) = \arctan\left[\frac{Im\{X(k)\}}{Re\{X(k)\}}\right] = \arctan\left[\frac{X(k) - X^*(k)}{X(k) + X^*(k)}\right] \tag{9b}$$

where

P(k)=measure of estimated magnitude of spectral component k, and

Φ(k)=measure of estimated phase of spectral component k.

Measures of estimated spectral magnitude and phase can be derived from filter banks generating a spectral representation comprising the spectral components X(k). These components can be obtained from a G-TDAC filter bank implemented by the complex transform shown above in expression 4, or from two filter banks implemented by separate transforms. Efficient techniques for implementing these filter banks are discussed below.

The measures of magnitude and phase derived from the spectral representations are only estimates. This is not caused by any deficiency in the technique used by the present invention but is rather caused by an unavoidable tradeoff between the resolution of spatial or temporal measurement and the resolution of spectral measurement. As the length of the signal sample block or filter bank decreases, the temporal resolution of magnitude measurement increases but the resolution of spectral measurement decreases. In spite of these uncertainties, systems incorporating aspects of the present invention with critically-sampled filter banks implemented by overlapping-block transforms can derive measures of spectral magnitude and phase which are considerably more accurate than can systems using other methods. The accuracy of the derived measures is sufficient for many applications.

D. Processor

In coding applications, processor 50 generates an encoded signal by encoding the spectral representation generated by falter bank 20. In alternative embodiments, processor 50 may encode the measures of magnitude and/or phase derived by phasor 40. The spectral representation generated by filter bank 30 is not encoded in preferred embodiments. No particular implementation of processor 50 is critical to the practice of the present invention. Generally, only measures of spectral magnitude are needed in single-channel coding systems. Measures of spectral phase are more useful in multi-channel coding systems, discussed below.

In coding applications, processor 50 may also assemble the encoded signal into an output signal suitable for transmission or storage. Any additional side-information needed by a decoder is also assembled into the output signal. Frame synchronization bits and error detection/correction codes may be used as needed for transmission. Database pointers or keys may be added as needed for storage.

II. Alternative Embodiments

A. Multi-Channel Coder

Figure 3:
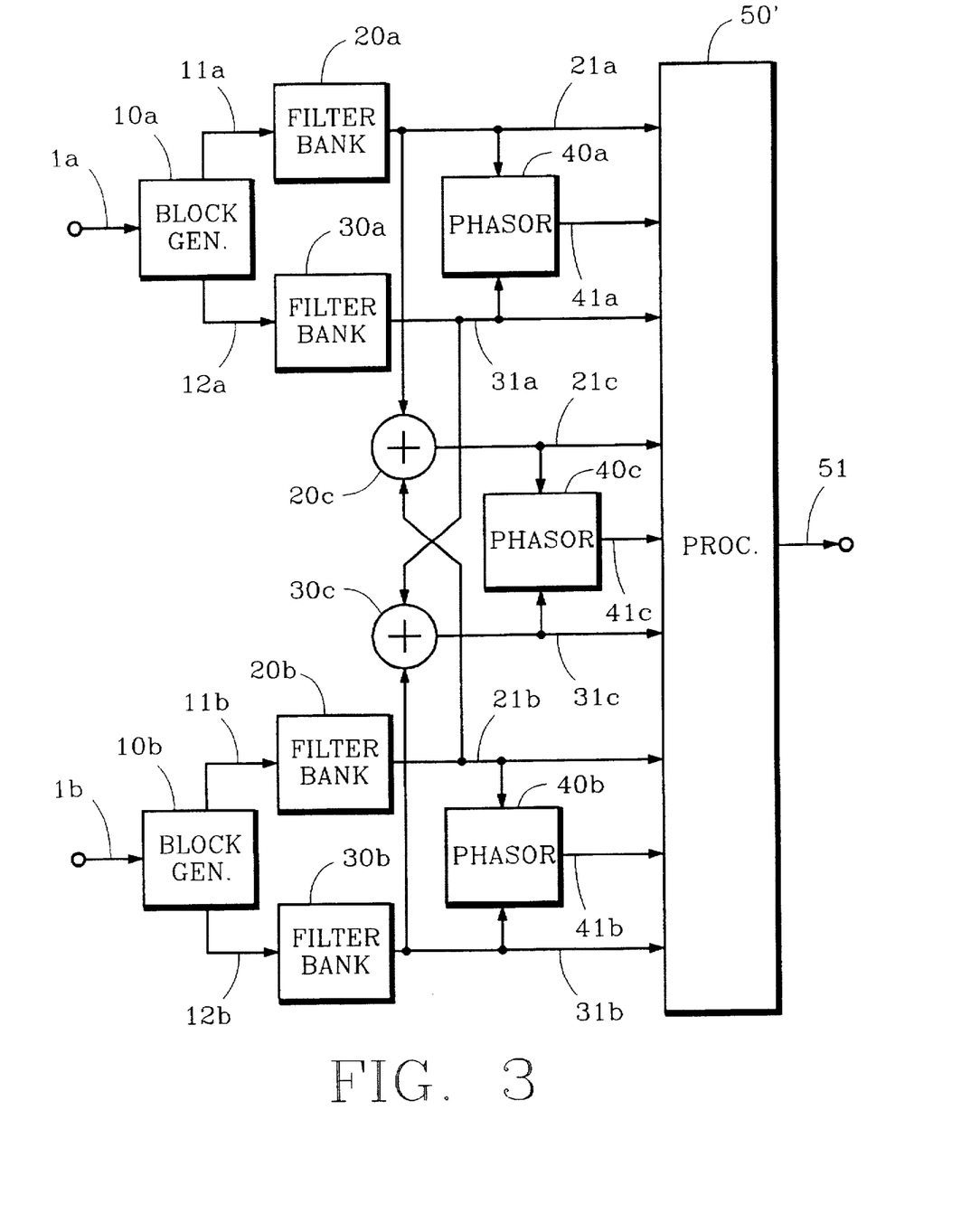
FIG. 3 is a functional block diagram of a two-channel device with two filter banks generating two spectral representations for each channel from which respective measures of spectral magnitude and/or phase are derived, and a processor generating an output signal by processing the spectral representations using a process adapted in response to the derived measures of spectral magnitude and/or phase.

FIG. 3 illustrates the basic functions incorporated into a two-channel device according to another aspect of the present invention. Although only two channels are illustrated and discussed below, it should be appreciated that the present invention may be incorporated into devices for more than two channels. Block generator 10a groups input samples received from a first-channel input signal path 1a into a sequence of signal sample blocks, filter bank 20a generates along path 21a a first spectral representation of the sequence of signal sample blocks received from path 11a, filter bank 30a generates along path 31a a second spectral representation of the sequence of signal sample blocks received from path 12a, and phasor 40a derives measures of magnitude and phase of spectral components in the first-channel input signal from the first and second spectral representations received from paths 21a and 31a, respectively, and passes the derived measures along path 41a.

Block generator 10b groups input samples received from a second-channel input signal path 1b into a sequence of signal sample blocks, filter bank 20b generates along path 21b a first spectral representation of the sequence of signal sample blocks received from path 11b, filter bank 30b generates along path 31b a second spectral representation of the sequence of signal sample blocks received from path 12b, and phasor 40b derives measures of magnitude and phase of spectral components in the second-channel input signal from the first and second spectral representations received from paths 21b and 31b, respectively, and passes the derived measures along path 41b.

Combiner 20c generates a first combined spectral representation by combining first spectral representations of the first- and second-channel input signals received from paths 21a and 21b, respectively, combiner 30c generates a second combined spectral representation by combining second spectral representations of the first- and second-channel input signals received from paths 31a and 31b, respectively, and phasor 40c derives measures of magnitude of spectral components of combined first- and second-channel input signals from the first and second combined spectral representations received from paths 21c and 31c, respectively, and passes the derived measures along path 41c. Measures of combined spectral phase can also be derived but they are not needed in many applications.

Processor 50' generates an output signal along path 51 in response to the first spectral representations received from paths 21a, 21b and 21c, using a process adapted in response to the derived measures received from paths 41a, 41b and 41c.

Figure 5:
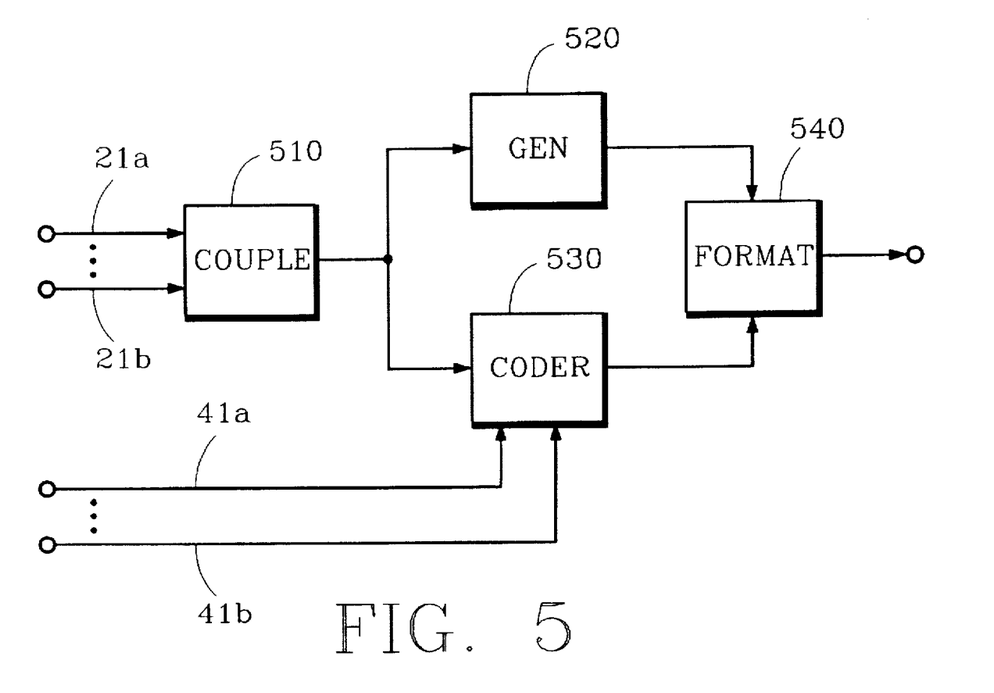
FIG. 5 is a functional block diagram of features in one embodiment of a signal processor which combine and encode spectral representations from multiple channels in accordance with measures of spectral magnitude and/or phase for each channel.

Many alternatives including those discussed above for a single-channel device are applicable to a multi-channel device such as that just described and illustrated in FIG. 3. For example, as shown in FIG. 5, processor 50' may comprise coupler 510 which generates the combined or "coupled" spectral representation by combining spectral components of the first spectral representations of the input signals received from paths 21a and 21b, generator 520 which generates side information representing the relative spectral magnitude of the spectral components represented in the coupled spectral representation, coder 530 which generates an encoded signal by encoding the coupled spectral representation using a number of bits adaptively allocated in response to measures of spectral magnitude received from paths 41a and 41b, and formatter 540 which assembles the encoded signal and the side information into an output signal. Furthermore, as discussed below, coupler 510 may adapt the combining of spectral components in response to measures of phase received from paths 41a and 41b.

The functions performed by the block generator, filter bank and phasor components are substantially the same as that discussed above for a single-channel device. The following discusses additional and alternative functions appropriate for a multi-channel device such as that illustrated in FIG. 3.

B. Combiner

Combiners 20c and 30c combine spectral representations of multiple input signals to form combined spectral representations which, in effect, represent the spectral composition of a signal that could be created by combining the input signals. In a simple embodiment, the combining is accomplished by merely adding signal components together; however, it should be apparent that out-of-phase components combine destructively. For example, two equal-magnitude components 180 degrees apart in phase will cancel when combined. This problem is discussed in more detail below. For ease of discussion, errors in amplitude caused by combining signal components with unequal phase are referred to herein simply as "cancellation".

C. Processor

In coding applications, processor 50' generates an encoded signal by encoding the spectral representations received from paths 21a, 21b and 21c. Processor 50' may also encode the measures of magnitude and/or phase received from paths 41a, 41b and 41c, and/or it may encode some information representing the spectral representations received from paths 31a, 31b and 31c. The encoded signal is assembled into an output signal suitable for transmission or storage in a manner similar to that described above for single-channel coders.

A multi-channel coding system may attempt to reduce redundancy between individual channels by "coupling" or otherwise jointly coding multiple channels. Preferably, only high-frequency subband signals are coupled because empirical evidence has shown that the effects of coupling or joint coding are not as audible for higher frequencies. Examples of multi-channel coding techniques are described in international patent application WO 92/12607 published Jul. 23, 1992, and in "ISO 11172-3 Compatible Low Bit Rate Multi-Channel Audio Coding System." ISO/IEC JTC1/SC29/WG11, draft dated Mar. 31, 1993, all of which are incorporated by reference in their entirety.

The multi-channel coding techniques referred to above are similar in that each includes generating a composite or "coupled" signal representing a frequency subband of a number of individual channels and generating side-information necessary to reconstruct a replica of the individual channels in the coupled subband. For example, a coupled signal is formed from the average of individual channel subband signals and side-information is generated representing the peak spectral amplitude of each individual channel in the coupled subband. Unfortunately, as mentioned briefly above, out-of-phase spectral components combine destructively, and the side-information will generally misrepresent the contribution of each individual channel subband signal to the coupled signal because the side-information is obtained from subband signal amplitude rather than spectral magnitude. In a coding system incorporating various aspects of the present invention, a coupled channel can be formed which avoids the problems of cancellation and side-information can be generated which more accurately represents the true contribution of each individual channel. A few techniques are discussed here and others will be apparent.

1. Magnitude

Accurate measures of magnitude are needed in perceptual coding systems so that encoders can make optimum bit allocations and so that decoders can properly reconstruct individual spectral components from a coupled representation. Allocations to a coupled representation can be based on the magnitude of the coupled representation or on the magnitude of the largest spectral component from the individual channels included in the coupled representation.

Reconstruction of individual spectral components from a coupled representation may be done using the relative magnitude of the individual spectral components included in the coupled representation. In one embodiment, the encoded signal includes information representing the ratio of the magnitude of each individual spectral component to the total magnitude of the coupled representation.

2. Phase

According to one technique, processor 50' avoids cancellation by ensuring that the encoded signal does not include a coupled representation of any spectral components which have phase differences greater than some threshold, say 45 degrees.

According to another technique, processor 50' identifies spectral coefficients to be coupled and examines the difference in phase between those components in the first-channel input signal and the second-channel input signal. In response to detecting a difference in phase of more than 90 degrees, processor 50' instructs combiner 20c to take the difference between corresponding spectral components rather than to take the sum. Side-information conveying this inversion may be included in the encoded signal allowing a decoder to compensate. In this manner, phase differences are never allowed to exceed 90 degrees. If the phase difference fluctuates on either side of 90 degrees, however, audible artifacts may be generated by numerous changes in phase inversion. This effect can be reduced by using two thresholds on either side of 90 degrees instead of one threshold at 90 degrees, imposing some hysteresis into the decision to invert a spectral component.

According to yet another technique, processor 50' identifies spectral coefficients to be coupled and examines the difference in phase between those components in the first-channel input signal and the second-channel input signal. If the difference in phase is substantially constant over a period of say 50 to 100 msec., the phase of one or both of those spectral components is adjusted so that the phase difference converges to zero. The speed of convergence is limited to avoid audible artifacts. This technique is very useful in situations where the spectral components of the first-channel and the second-channel signals are highly correlated. This condition arises, for example, when a solo instrument or voice is recorded by multiple microphones.

III. Efficient Filter Bank Implementation

The conventional TDAC filter banks may be implemented efficiently using techniques such as those disclosed in references cited above. The G-TDAC filter banks may also be implemented efficiently; however, two spectral representations are required to derive measures of magnitude or phase.

One implementation for generating a first spectral representation also implements the GO-TDAC filter bank. The implementation includes the steps of (1) "folding" and "shuffling" a block of N real-valued input signal samples x(n) to form ¼N complex-valued samples y(n), (2) rotating the complex-valued samples in the complex plane to form ¼N rotated samples z(n), (3) transforming the rotated samples into ¼N interim transform coefficients Z(k), (4) rotating the interim transform coefficients to form ¼N rotated transform coefficients Y(k), and (5) shuffling the complex-valued rotated transform coefficients to form a block ½N spectral values $C_{GO}(k)$. Referring to FIGS. 1 and 3, the $C_{GO}(k)$ values represent the first spectral representation generated by filter bank 20, 20a and 20b.

A technique for generating the corresponding second spectral representation includes the same steps discussed above except for minor differences in steps (1) and (5). In one implementation, step (1) is performed in an identical manner except that the order of the input signal samples x(n) in each sample block is reversed. In an another implementation, the input signal samples are folded and shuffled in a slightly different manner which effectively combines the effects of time reversal, folding and shuffling.

For the filter bank generating the first spectral representation, folding and shuffling a block of N real-valued input signal samples to form ¼N complex-valued samples y(n) may be expressed as $$y_R(n) = x\left(\frac{N}{4} + 2n\right) - x\left(\frac{N}{4} - 2n - 1\right) \quad (10a)$$

$$y_I(n) = -x\left(\frac{3N}{4} + 2n\right) - x\left(\frac{3N}{4} - 2n - 1\right)$$

$$\text{for } 0 \leq n < \frac{N}{8}$$

$$y_R(n) = x\left(\frac{N}{4} + 2n\right) + x\left(\frac{5N}{4} - 2n - 1\right) \quad (10b)$$

$$y_I(n) = x\left(-\frac{N}{4} + 2n\right) - x\left(\frac{3N}{4} - 2n - 1\right)$$

$$\text{for } \frac{N}{8} \leq n < \frac{N}{4}$$

where $y_R(n)$=real part of the complex-valued sample y(n), and
$y_I(n)$=imaginary part of the complex-valued sample y(n).

For the filter bank generating the second spectral representation, as noted above, the folding and shuffling may be performed according to these same equations provided the order of the input signal samples x(n) in each signal sample block is first reversed in time order. Alternatively, folding and shuffling without time reversal may be performed according to $$y_R(n) = -x\left(\frac{3N}{4} + 2n\right) + x\left(\frac{3N}{4} - 2n - 1\right) \quad (11a)$$

$$y_I(n) = -x\left(\frac{N}{4} + 2n\right) - x\left(\frac{N}{4} - 2n - 1\right)$$

$$\text{for } 0 \leq n < \frac{N}{8}$$

$$y_R(n) = x\left(-\frac{N}{4} + 2n\right) + x\left(\frac{3N}{4} - 2n - 1\right) \quad (11b)$$

$$y_I(n) = -x\left(\frac{N}{4} + 2n\right) + x\left(\frac{5N}{4} - 2n - 1\right)$$

$$\text{for } \frac{N}{8} \leq n < \frac{N}{4}$$

The rotation of the complex-valued samples may be expressed as $$z(n) = y(n) \cdot e^{-j2\pi \frac{8n+1}{8N}} \quad (12)$$

Interim transform coefficients are generated by applying a Fast Fourier Transform to the rotated samples, which may be expressed as $$Z(k) = FFT[z(n)] = \frac{4}{N} \sum_{n=0}^{N-1} z(n) \cdot e^{-j2\pi \frac{4nk}{N}} \quad (13)$$

Rotation of the interim transform coefficients may be expressed as $$Y(k) = Z(k) \cdot e^{-j2\pi \frac{8k+1}{8N}} \quad (14)$$

The rotated coefficients are shuffled to form two spectral representations. The spectral values in the first spectral representation correspond to the spectral values generated by the GO-TDAC filter bank. The odd-numbered spectral values may be obtained from $$C_{GO}(N/2 - 2k - 1) = Re\{Y(k)\} \text{ for } 0 \leq k < N/4 \quad (15a)$$

and the even-numbered spectral values may be obtained from $$C_{GO}(2k) = -Im\{Y(k)\} \text{ for } 0 \leq k < N/4 \quad (15b)$$

The spectral values $S_{GO}(k)$ in the second spectral representation may be obtained in similar fashion. The odd-numbered spectral values may be obtained from $$S_{GO}(N/2 - 2k - 1) = Re\{Y(k)\} \text{ for } 0 \leq k < N/4 \quad (16a)$$

and the even-numbered spectral values may be obtained from $$S_{GO}(2k) = Im\{Y(k)\} \text{ for } 0 \leq k < N/4 \quad (16b)$$

From expression 5a it is known that $C_{GO}(k) = X_R(k)$ and it can be shown that $S_{GO}(k) = X_I(k)$; therefore, from expressions 9a and 9b discussed above, it follows that measures of estimated spectral magnitude and phase, respectively, may be obtained from the two expressions $$P(k) = (C_{GO}(k))^2 + (S_{GO}(k))^2 \quad (17)$$

$$\Phi(k) = \arctan\left[\frac{S_{GO}(k)}{C_{GO}(k)}\right]$$

Figure 4A:
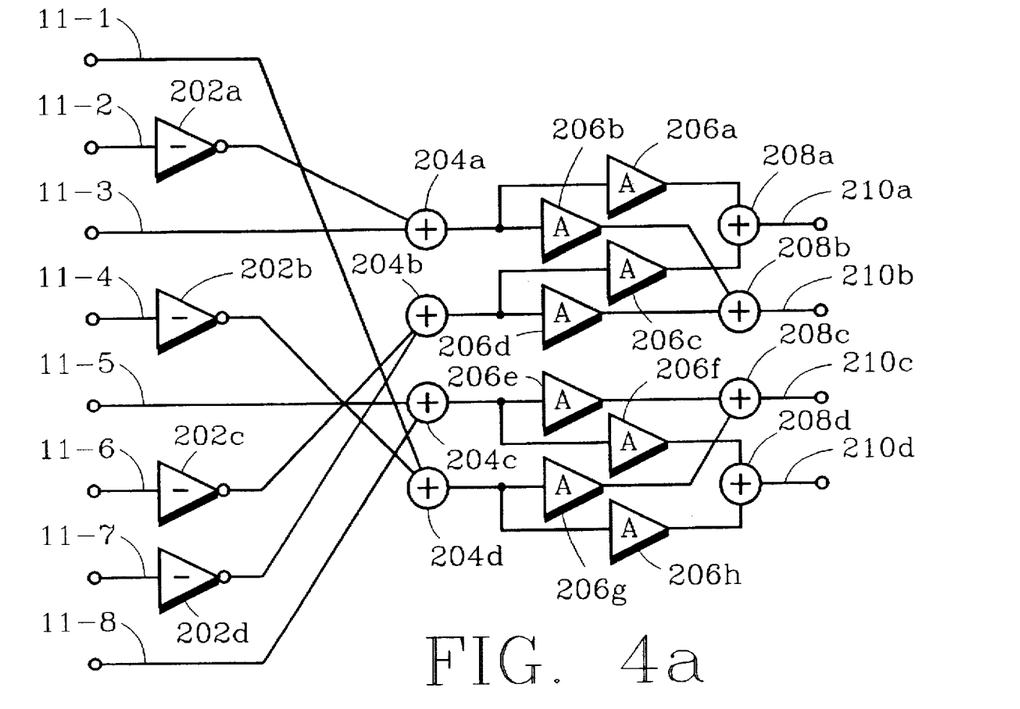
FIGS. 4a–4c are schematic representations of circuits which may be used to implement a generalized O-TDAC filter bank.
Figure 4B:
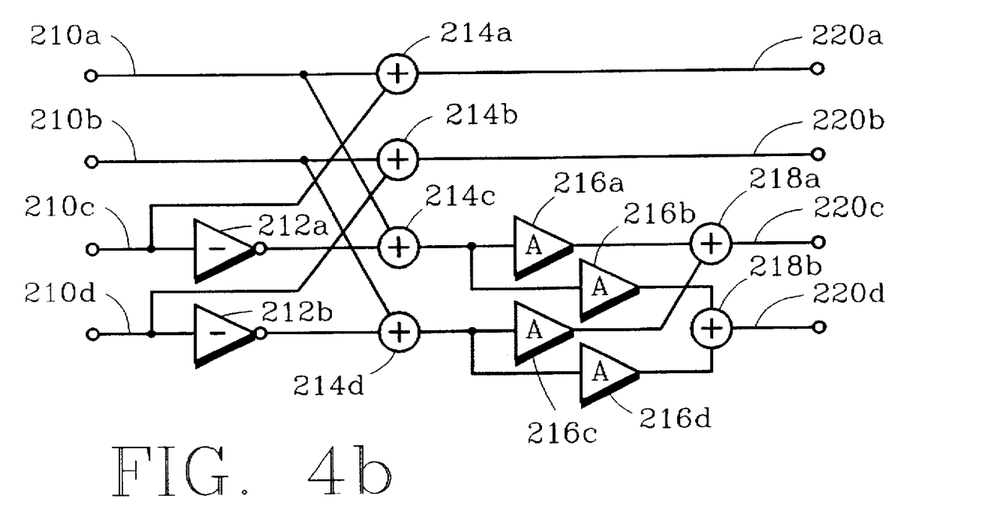
Figure 4C:
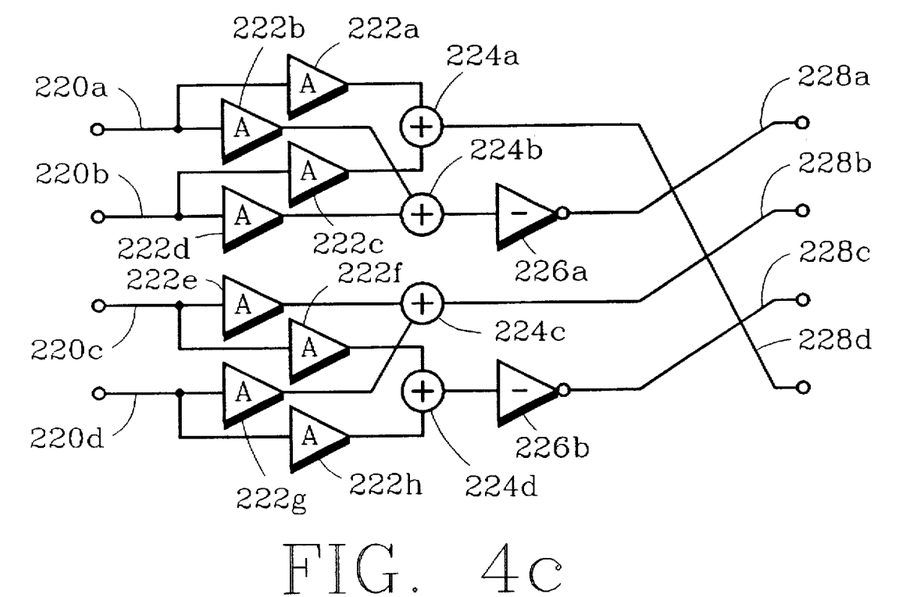

FIGS. 4a–4c illustrate in schematic form a circuit which generates spectral signals representing the $C_{GO}(k)$ values. For ease of illustration and discussion, the circuit shown in the figures implements an 8-point transform. Short transforms, for example four to sixteen points, are often used in video coding applications but longer transforms, for example 128 to 4096 points, are typically used in audio coding applications. It should be apparent that the circuit may be extended to implement transforms of various lengths.

Referring to FIG. 4a, eight signal samples x(n) are received from a buffer along paths 11-1 to 11-8. The folding and shuffling of the input signal samples is provided by inverters 202a to 202d which perform necessary sign inversions and combiners 204a to 204d which combine two signals into one. The signals passed by combiners 204a and 204b, respectively, represent the real and imaginary parts of a complex-valued signal y(0) and the signals passed by combiners 204c and 204d, respectively, represent the real and imaginary parts of a complex-valued signal y(1).

A rotation of the complex-valued signals is provided by amplifiers 206a to 206h and combiners 208a to 208d. The signals passed by combiners 208a and 208b, respectively, represent the real and imaginary parts of a complex-valued signal z(0) and the signals passed by combiners 208c and 208d, respectively, represent the real and imaginary parts of a complex-valued signal z(1). The gain of the amplifiers may be determined from expression 12. In this example, the gains of amplifiers 206a to 206d are $\cos\theta_0$, $-\sin\theta_0$, $\cos\theta_0$ and $\sin\theta_0$, respectively, where $\theta_0=(2\pi/64)$ radians. The gains of amplifiers 206e to 206h are $\cos\theta_1$, $-\sin\theta_1$, $\cos\theta_1$ and $\sin\theta_1$, respectively, where $\theta_1=2\pi(65/64)$ radians.

Referring to FIG. 4b, the rotated complex-valued signals received from paths 210a to 210d are transformed by a 2-point FFT. The butterfly of the transform is implemented by inverters 212a and 212b, combiners 214a to 214d, and the complex multiplication is implemented by amplifiers 216a to 216d, and combiners 218a and 218b. These circuit elements implement a decimation-in-frequency FFT. According to expression 13 above, a scale factor of ¼N should also be applied to the signals. This scaling may be accomplished by introducing additional amplifiers into the illustrated circuit, or by adjusting the gain of amplifiers 206a to 206h and/or 222a to 222h. It is not critical to the practice of the present invention whether or not scaling is done and, if it is done, where or how it is done. Other implementations of the FFT may be substituted for the circuit shown in the figure.

Referring to FIG. 4c, the signals received from paths 220a and 220b, respectively, represent the real and imaginary parts of a complex-valued signal representing interim transform coefficient Z(0) and the signals received from paths 220c and 220d, respectively, represent the real and imaginary parts of a complex-valued signal representing interim transform coefficient Z(1). A rotation of these signals is provided by amplifiers 222a to 222h and combiners 224a to 224d. The gain of these amplifiers may be determined from expression 14. In this example, the gains of amplifiers 222a to 222d are $\cos\theta_0$, $-\sin\theta_0$, $\cos\theta_0$ and $\sin\theta_0$, respectively, where $\theta_0=(2\pi/64)$ radians. The gains of amplifiers 222e to 222h are $\cos\theta_1$, $-\sin\theta_1$, $\cos\theta_1$ and $\sin\theta_1$, respectively, where $\theta_1=2\pi(65/64)$ radians. The signals passed by combiners 224a and 224b, respectively, represent the real and imaginary part of a complex-valued signal Y(0) and the signals passed by combiners 224c and 224d, respectively, represent the real and imaginary part of a complex-valued signal Y(1).

The rotated transform signals are then shuffled and changed in sign as needed to provide spectral signals representing the $C_{GO}(k)$ values of the first spectral representation. Inverters 226a and 226b invert the sign of the two signals received from combiners 224b and 224d, respectively. Signals are shuffled such that the real and imaginary parts of signal Y(0) are passed along paths 228d and 228a, respectively, and the real and imaginary parts of signal Y(1) are passed along paths 228b and 228c, respectively. Referring to expressions 15a and 15b above, it can be seen that the four signals presented along paths 228a to 228d correspond to the spectral values $C_{GO}(0)$ to $C_{GO}(3)$, respectively.

A circuit similar to that illustrated in FIGS. 4a–4c may be used to generate spectral signals representing the $S_{GO}(k)$ values. Referring to FIG. 4a, paths 11-1 to 11-7 would correspond to paths 12-7 to 12-1, respectively. Referring to FIG. 4c, inverters 226a and 226b would not be required. From expressions 16a and 16b above, it can be seen that the four signals presented along paths 228a to 228d correspond to spectral values $S_{GO}(0)$ to $S_{GO}(3)$, respectively.

Although not shown in any figure, it should be apparent that the spectral signals can be fed to voltage-controlled amplifiers to implement the multiplication and division of expressions 17 and 18 above to generate signals representing measures of spectral magnitude and phase.

The circuits illustrated in FIGS. 4a–4c represent an analog embodiment. A digital embodiment may also be implemented using either digital circuits to calculate sums, differences, products and quotients of digital values or software-controlled processor to perform these same functions. As discussed in "DSP Principles," Studio Sound, April 1994, pp. 73–78, which is incorporated by reference in its entirety, implementation by a DSP "chip" such as the Motorola DSP 56001 is attractive because it offers advantages in flexibility and cost. An example of an encoder including filter banks and coding processes implemented by a DSP chip is disclosed in Fielder and Davidson, U.S. Pat. No. 5,109,417 issued Apr. 28, 1992, which is incorporated by reference in its entirety.

In processor-based implementations, various calculations may be combined to improve efficiency and scaling of interim calculations may be desired to prevent arithmetic overflow. For example, in an embodiment using the Motorola DSP56001 processor, efficiency can be improved by concurrently performing additions and subtractions, for the folding and shuffling of input signal samples, with multiplications for applying an analysis-window function. As a further example, the input signal samples can be scaled by one-half to ensure arithmetic overflow does not occur during folding and shuffling or during subsequent calculations. In a preferred embodiment of a coding system, for example, windowed input signal samples are scaled by one-half prior to or concurrent with folding and shuffling, and compensation for the scaling is made during or after overlap-add of signal blocks recovered by a complementary synthesis filter bank. Different considerations apply to other implementations such as those using floating-point arithmetic.

We claim:

1. A device for processing an input signal comprising input signal samples representing audio information, said device comprising buffer means for receiving a plurality of said input signal samples and forming a sequence of signal sample blocks, spectral means for generating first spectral representations by applying a first single-sideband filter bank to said sequence of signal sample blocks, and generating second spectral representations by applying a second single-sideband filter bank to said sequence of signal sample blocks, phasor means for deriving measures of magnitude and/or phase of spectral components in said audio information in response to said first and second spectral representations, and processor means for processing said first spectral representations to generate an output signal suitable for transmission or storage, wherein said processing is adapted in response to said measures of magnitude and/or phase of spectral components.

2. A device according to claim 1 wherein successive blocks in said sequence of signal sample blocks overlap one another and said first and second single-sideband filter banks are implemented by discrete transforms.

3. A device according to claim 2 wherein said first and second single-sideband filter banks are critically-sampled.

4. A device according to claim 3 wherein said first single-sideband filter bank comprises means for folding said input signal samples in a respective signal sample block into a set of first combined samples, means for shuffling the order of said first combined samples into a set of first complex-valued samples, means for applying a first complex rotational function to said first complex-valued samples, means for generating first interim transform coefficients by applying a first transform function to said rotated first complex-valued samples, means for applying a second complex rotation function to said first interim transform coefficients, and means for shuffling said rotated first interim transform coefficients into a respective first spectral representation, and wherein said second single-sideband filter bank comprises means for folding said input signal samples in a respective signal sample block into a set of second combined samples, means for shuffling the order of said second combined samples into a set of second complex-valued samples, means for applying a third complex rotational function to said second complex-valued samples, means for generating second interim transform coefficients by applying a second transform function to said rotated second complex-valued samples, means for applying a fourth complex rotation function to said second interim transform coefficients, and means for shuffling said rotated second interim transform coefficients into a respective second spectral representation.

5. A device according to claim 1 wherein said first and second single-sideband filter banks are critically-sampled.

6. A device according to claim 1 wherein said processor means generates an encoded signal by encoding said first spectral representations using a number of bits adaptively allocated in response to said measures of spectral magnitude, and assembles said encoded signal in said output signal.

7. A device for processing two or more input signals comprising input signal samples representing audio information, wherein said device comprises for each respective input signal buffer means for receiving a plurality of said input signal samples representing said respective input signal and forming a sequence of signal sample blocks, spectral means for generating first spectral representations by applying a first single-sideband filter bank to said sequence of signal sample blocks, and generating second spectral representations by applying a second single-sideband filter bank to said sequence of signal sample blocks, and phasor means for deriving measures of magnitude and/or phase of spectral components in said respective input signal in response to said first and second spectral representations, and further comprises processor means for processing first spectral representations for each respective input signal to generate an output signal suitable for transmission or storage, wherein said processing is adapted in response to said measures of magnitude and/or phase of spectral components corresponding to each of said input signals.

8. A device according to claim 7 wherein, for a respective input signal, successive blocks in said sequence of signal sample blocks overlap one another and said first and second single-sideband filter banks are implemented by discrete transforms.

9. A device according to claim 8 wherein said first and second single-sideband filter banks are critically-sampled.

10. A device according to claim 9 wherein said first single-sideband filter bank comprises means for folding said input signal samples in a respective signal sample block into a set of first combined samples, means for shuffling the order of said first combined samples into a set of first complex-valued samples, means for applying a first complex rotational function to said first complex-valued samples, means for generating first interim transform coefficients by applying a first transform function to said rotated first complex-valued samples, means for applying a second complex rotation function to said first interim transform coefficients, and means for shuffling said rotated first interim transform coefficients into a respective first spectral representation, and wherein said second single-sideband filter bank comprises means for folding said input signal samples in a respective signal sample block into a set of second combined samples, means for shuffling the order of said second combined samples into a set of second complex-valued samples, means for applying a third complex rotational function to said second complex-valued samples, means for generating second interim transform coefficients by applying a second transform function to said rotated second complex-valued samples, means for applying a fourth complex rotation function to said second interim transform coefficients, and means for shuffling said rotated second interim transform coefficients into a respective second spectral representation.

11. A device according to claim 7 wherein said first and second single-sideband filter banks are critically-sampled.

12. A device according to claim 7 wherein said processor means generates an encoded signal by encoding said first spectral representations using a number of bits adaptively allocated in response to said measures of spectral magnitude, and assembles said encoded signal in said output signal.

13. A device according to claim 7 wherein said processor means comprises coupling means for generating a coupled spectral representation by combining spectral components of first spectral representations corresponding to said two or more input signals, side means for generating side-information representing relative spectral magnitude of spectral components represented in said coupled spectral representation, encoding means for generating an encoded signal by encoding said coupled spectral representation using a number of bits adaptively allocated in response to said measures of spectral magnitude, and formatting means for assembling said encoded signal and said side-information into said output signal.

14. A device according to claim 13 wherein said coupling means adapts said combining in response to said measures of phase so as to avoid cancellation.

15. A method for processing an input signal comprising input signal samples representing audio information, said device comprising receiving a plurality of said input signal samples and forming a sequence of signal sample blocks, generating first spectral representations by applying a first single-sideband filter bank to said sequence of signal sample blocks, and generating second spectral representations by applying a second single-sideband filter bank to said sequence of signal sample blocks, deriving measures of magnitude and/or phase of spectral components in said audio information in response to said first and second spectral representations, and processing said first spectral representations to generate an output signal suitable for transmission or storage, wherein said processing is adapted in response to said measures of magnitude and/or phase of spectral components.

16. A method according to claim 15 wherein successive blocks in said sequence of signal sample blocks overlap one another and said first and second single-sideband filter banks are implemented by discrete transforms.

17. A method according to claim 16 wherein said first and second single-sideband filter banks are critically-sampled.

18. A method according to claim 17 wherein the applying of said first single-sideband filter bank comprises the steps of folding said input signal samples in a respective signal sample block into a set of first combined samples, shuffling the order of said first combined samples into a set of first complex-valued samples, applying a first complex rotational function to said first complex-valued samples, generating first interim transform coefficients by applying a first transform function to said rotated first complex-valued samples, applying a second complex rotation function to said first interim transform coefficients, and shuffling said rotated first interim transform coefficients into a respective first spectral representation.

and wherein the applying of said second single-sideband filter bank comprises the steps of folding said input signal samples in a respective signal sample block into a set of second combined samples, shuffling the order of said second combined samples into a set of second complex-valued samples, applying a third complex rotational function to said second complex-valued samples, generating second interim transform coefficients by applying a second transform function to said rotated second complex-valued samples, applying a fourth complex rotation function to said second interim transform coefficients, and shuffling said rotated second interim transform coefficients into a respective second spectral representation.

19. A method according to claim 15 wherein said first and second single-sideband filter banks are critically-sampled.

20. A method according to claim 15 wherein said processing generates an encoded signal by encoding said first spectral representations using a number of bits adaptively allocated in response to said measures of spectral magnitude, and assembles said encoded signal in said output signal.

* * * * *